F. THORNTON, JR.
METHOD AND APPARATUS FOR BAKING COATINGS ON SHELL CASINGS.
APPLICATION FILED MAR. 13, 1918.

1,321,492.

Patented Nov. 11, 1919.

WITNESSES:

INVENTOR
Frank Thornton Jr.
BY
ATTORNEY

UNITED STATES PATENT OFFICE.

FRANK THORNTON, JR., OF WILKINSBURG, PENNSYLVANIA, ASSIGNOR TO WESTINGHOUSE ELECTRIC & MANUFACTURING COMPANY, A CORPORATION OF PENNSYLVANIA.

METHOD AND APPARATUS FOR BAKING COATINGS ON SHELL-CASINGS.

1,321,492.     Specification of Letters Patent.     Patented Nov. 11, 1919.

Application filed March 13, 1918. Serial No. 222,163.

*To all whom it may concern:*

Be it known that I, FRANK THORNTON, Jr., a citizen of the United States, and a resident of Wilkinsburg, in the county of Allegheny and State of Pennsylvania, have invented a new and useful Improvement in Methods and Apparatus for Baking Coatings on Shell-Casings, of which the following is a specification.

This invention relates to a method of, and apparatus for, baking the varnish on the interiors of shell or projectile casings.

The interior surfaces of high-explosive shell or projectile casings must be thoroughly varnished in order to protect the metal from chemical action caused by the explosive compound. On account of the extremely great weight of the metal, in proportion to the weight of the varnish, the baking of a large quantity of these shell casings in ovens is a very slow and somewhat expensive process. The absorption of heat by the heavy shell bodies takes place at such a low rate that the operation of the ovens is very inefficient. Usually, it requires from six to eight hours to bake the varnish coating in an oven maintained at approximately 375° F.

I have discovered that, if the heat is generated within the mass of steel itself, it is possible to overcome the above difficulties, since the necessary amount of heat may be forced into the steel casing without a very high temperature drop. As the means of generating the baking heat, I employ an apparatus which will form a complete circuit of magnetizable material with the shell casing to be heated, inducing an alternating magnetizing flux in this circuit by means of a coil in inductive relation to the magnetizable material and connected to a source of alternating current.

Figure 2:
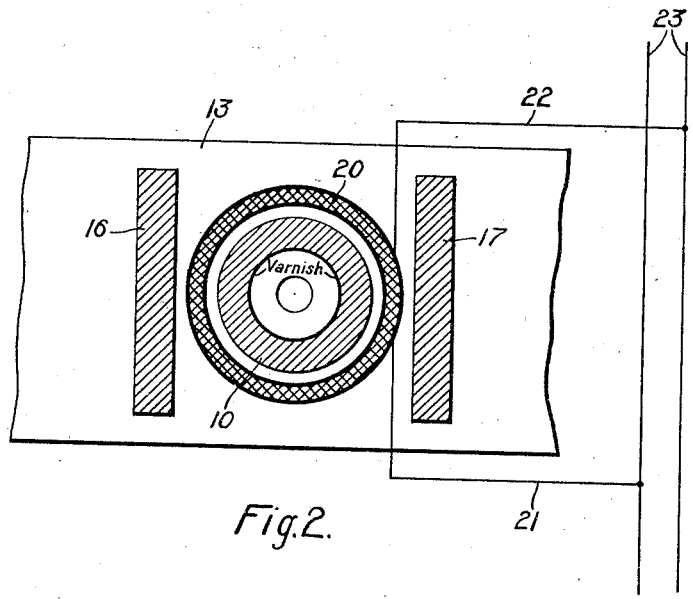
Figure 1:
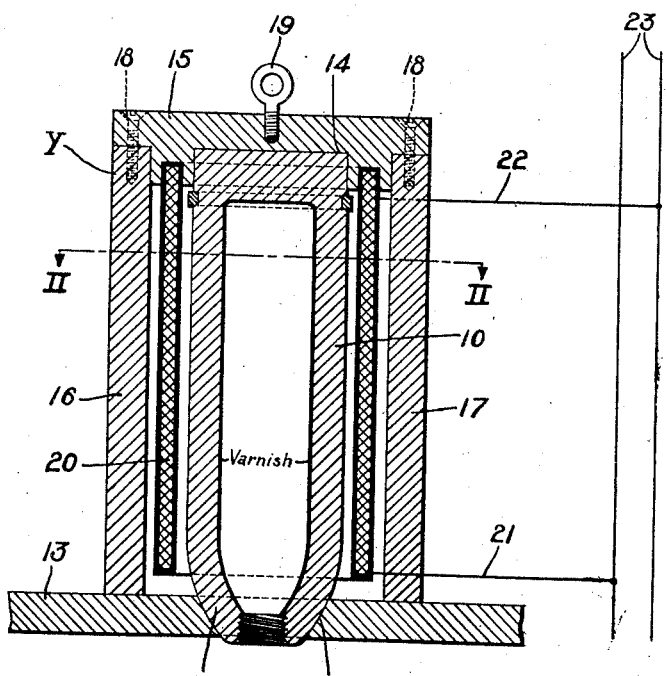

The above and other objects and the novel features of my invention will be apparent from the following description taken in connection with the drawing in which Figure 1 is a vertical sectional view of an apparatus embodying my invention, showing a projectile casing in heating position, and Fig. 2 is a horizontal sectional view taken on the line II—II of Fig. 1.

Referring to the drawing, 10 designates a hollow steel-shell casing, the nose 11 of which fits in a seat 12 in the base 13. The casing is thus supported in an upright, but inverted, position on the base 13 and in good magnetic contact with the base.

The upper end of the casing 10 loosely fits in a socket 14 in the under side of the cross-piece 15 of a yoke Y. The socket 14 serves to center the upper end of the casing 10. The cross-piece 15 is supported, at the proper height to maintain a good magnetic contact with the casing 10, by the sides 16 and 17, which rest on the upper surface of the base 13. The sides 16 and 17 are secured to the cross-piece 15 by screws 18, so that the entire yoke may be lifted from the casing 10 by a crane or other device having means to engage the eye-bolt 19.

It will be seen from the foregoing that, when the shell casing is in position between the yoke and base, a complete circuit of magnetizable material is provided. A magnetizing flux is induced in this circuit of magnetizable material by means of a magnetic flux inducing coil 20 of slightly larger diameter than the shell casing 10 and carried by the cross-piece 15 of the yoke, but insulated therefrom. The terminals 21 and 22 of the coil 20 are connected to alternating-current supply mains 23. Therefore, when the current is passed through the coil 20, an alternating magnetizing flux is induced in the circuit of magnetizable material that includes the shell casing 10 and, if continued for a sufficient time, will heat the casing to the baking temperature of the coating applied to the inside thereof. When the coating has been baked, the yoke and coil 20 are removed to permit removal of the casing, automatic switches (not shown) being provided to turn off the current when the coil is removed from the shell.

By the use of my method and apparatus, it has been possible to heat 90-pound casings to an average temperature of 110° C. in slightly less than 30 minutes. After the current was turned off, the casing was permitted to cool off slowly and, when examined at the end of two hours, it was found that the varnish was thoroughly baked on the inner surface.

While I have shown and described my method and apparatus in detail, it is to be understood that various modifications may be made therein without departing from the spirit of the invention or the scope of the appended claims.

I claim as my invention:

1. The method of electrically baking a coating on an article comprising magnetizable material that consists in including the article as a part of a circuit of magnetizable material, and producing a magnetizing flux in said circuit.

2. The method of electrically baking a coating on an article comprising magnetizable material that consists in including the article as a link of a circuit of magnetizable material, and inducing an alternating magnetizing flux in said circuit.

3. The method of electrically baking a coating on an article of magnetizable material that consists in passing a magnetizing flux through said article.

4. The method of electrically baking a coating on a projectile casing that consists in inducing an alternating magnetizing flux in the magnetizable material of said projectile casing.

5. The method of baking the coating on an article of magnetizable material that consists in heating the article, after the coating has been applied thereto, by inducing an alternating magnetizing flux in said article.

6. The method of baking a coating on a magnetizable article that comprises including the article as a part of a circuit of magnetizable material and heating the article, after the coating has been applied thereto, by inducing an alternating magnetizing flux in said circuit of magnetizable material.

7. The method of baking the coating on a projectile casing that consists in including said casing as a part of a circuit of magnetizable material and inducing an alternating magnetizing flux in said circuit for a sufficient time to heat said casing to a temperature that will bake the coating thereon.

8. The method of baking the interior coating of a hollow projectile casing that consists in including said casing as a link of a circuit of magnetizable material, and inducing an alternating magnetizing flux in said circuit for a sufficient period of time to heat said casing to a temperature that will bake the coating therein.

9. An apparatus for baking the coating on a magnetizable article, comprising a base, a yoke associated with the base, means on the yoke and base to engage the article and hold it in position to form, with the base and yoke, a complete circuit of magnetizable material, and an electrical winding surrounding the article for inducing a magnetizing flux in said circuit of said magnetizable material to heat the article.

10. An apparatus for baking the coating in a hollow projectile casing that comprises a base having means to engage one end of the projectile casing, a yoke mounted upon the base and having means at its upper end to engage the upper end of the casing, the sides of said yoke being spaced from the body of the casing when the latter is in position, and an electrical coil in the space between the article and the sides of the yoke adapted, when energized, to induce an alternating magnetizing flux in the magnetizable circuit formed by the projectile casing, the base and the yoke.

11. An apparatus for electrically heating projectile casings that comprises a base of conducting material adapted to support a projectile casing in upright position, a yoke of substantially U-shape adapted to be positioned over a casing supported upon the base with its ends engaging the base and its intermediate portion engaging and supporting the casing, and an electrical winding carried by the yoke to surround the casing when the yoke is in place.

In testimony whereof, I have hereunto subscribed my name this 27th day of Feb., 1918.

FRANK THORNTON, Jr.